US006447045B1

(12) United States Patent
Dickson et al.

(10) Patent No.: US 6,447,045 B1
(45) Date of Patent: Sep. 10, 2002

(54) TONNEAU COVER MOUNTING SYSTEM

(75) Inventors: Floyd R. Dickson, Huntsville; Henry Toy, Barrie; Mark Gillett, Bracebridge, all of (CA)

(73) Assignee: Algonquin International Industries, Inc., Huntsville (CA)

( * ) Notice: Subject to any disclaimer, the term of this patent is extended or adjusted under 35 U.S.C. 154(b) by 0 days.

(21) Appl. No.: 09/617,326

(22) Filed: Jul. 17, 2000

(51) Int. Cl.⁷ .............................. B60P 7/02; B62D 25/10
(52) U.S. Cl. ............................ 296/100.08; 296/100.07; 296/100.1; 180/69.21
(58) Field of Search ....................... 296/100.06, 100.07, 296/100.08, 100.1, 26.07, 173, 76, 100.02, 100.01; 180/69.2, 69.21

(56) References Cited

U.S. PATENT DOCUMENTS

| | | | |
|---|---|---|---|
| 4,097,958 A | * 7/1978 | Van Dell | 180/69.21 |
| 4,142,760 A | 3/1979 | Dockery et al. | |
| 4,261,611 A | * 4/1981 | Barry et al. | 296/100.07 |
| 4,366,598 A | * 1/1983 | Harasaki et al. | 180/69.21 |
| 4,762,360 A | 8/1988 | Huber | |
| 4,824,162 A | 4/1989 | Geisler et al. | |
| 4,861,092 A | 8/1989 | Bogard | |
| 5,009,457 A | * 4/1991 | Hall | 296/100.07 |
| 5,011,214 A | 4/1991 | Friesen et al. | |
| 5,058,946 A | * 10/1991 | Faber | 296/100 |
| 5,087,093 A | 2/1992 | Repetti | |
| 5,115,878 A | * 5/1992 | Hayata | 180/69.21 |
| 5,121,960 A | 6/1992 | Wheatley | |
| 5,131,712 A | * 7/1992 | Heinz | 296/100 |
| 5,322,336 A | 6/1994 | Isler | |
| 5,595,417 A | 1/1997 | Thoman et al. | |
| 5,632,522 A | * 5/1997 | Gaitan et al. | 296/100.06 |
| 5,636,893 A | 6/1997 | Wheatley et al. | |
| 5,743,586 A | 4/1998 | Nett | |
| 5,806,619 A | * 9/1998 | Kleinhoffer et al. | 180/69.2 |
| 5,904,393 A | * 5/1999 | Yoder | 296/100.07 |
| 5,951,095 A | * 9/1999 | Herndon | 296/26.07 |
| 5,957,525 A | * 9/1999 | Nelson | 296/100.06 |
| 5,971,446 A | * 10/1999 | Lunney, II | 296/100.08 |
| 5,971,469 A | * 10/1999 | Lund et al. | 296/100.06 |
| 5,988,728 A | * 11/1999 | Lund et al. | 296/100.08 |
| 6,042,173 A | * 3/2000 | Nett | 296/100.06 |
| 6,109,681 A | * 8/2000 | Edwards et al. | 296/100.06 |
| 6,149,217 A | * 11/2000 | Plamondon | 296/100.12 |
| 6,183,035 B1 | * 2/2001 | Rusu et al. | 296/100.07 |
| 6,217,102 B1 | * 4/2001 | Lathers | 296/100.07 |
| 6,343,828 B1 | * 2/2002 | Young et al. | 296/100.1 |
| 6,371,231 B1 | * 4/2002 | Nushii et al. | 180/69.21 |
| 2002/0003054 A1 | * 1/2002 | Kamada et al. | 180/69.2 |

FOREIGN PATENT DOCUMENTS

| | | | | |
|---|---|---|---|---|
| DE | 4019121 | * | 1/1991 | 296/76 |
| JP | 59-156872 | * | 9/1984 | 180/69.2 |
| JP | 60-124575 | * | 7/1985 | 180/69.2 |
| JP | 3-54079 | * | 3/1991 | 180/69.2 |

* cited by examiner

*Primary Examiner*—D. Glenn Dayoan
*Assistant Examiner*—H. Gutman
(74) *Attorney, Agent, or Firm*—Harness, Dickey & Pierce, PLC

(57) ABSTRACT

A tonneau cover assembly for a pick-up truck includes a cover that is manufactured by sandwiching a rectangular metal frame between an inner panel and an outer panel. The metal frame provides stability to the cover assembly as well as providing attachment points for the outer components of the tonneau cover assembly. The cover is pivotally attached to a pair of side rails using a four-bar linkage hinge, the four-bar linkage hinge causes the cover to move up from the pick-up box and away from the pick-up cab when the cover is opened. This up and away movement allows the cover to be positioned closer to the cab without causing interference between the cab and the cover when it pivots to its open position.

16 Claims, 5 Drawing Sheets

TONNEAU COVER MOUNTING SYSTEM

FIELD OF THE INVENTION

The present invention relates to a mounting system for a tonneau cover for a pick-up truck. More particularly, the present invention relates to a mounting system which positions the tonneau cover adjacent the cab when it is closed, pivots on a four-bar linkage system for opening the cover and provides for the vibration and movement between the pick-up bed and the tonneau cover.

BACKGROUND OF THE INVENTION

The popularity of the pick-up truck with the handyman, the camper, the hunter and the vacationer has significantly increased because of the pick-up truck's utility combined with the recent improvements in both styling and comfort. One of the disadvantages associated with the pick-up truck is its open cargo box. Any item placed in the open cargo box is susceptible to weathering and/or loss by theft. In order to overcome this disadvantage, the industry has designed various types of cargo box covers known in this industry as tonneau covers.

A variety of pick-up box or tonneau covers exist in the prior art. These prior art covers are manufactured from canvas, vinyl, single panels, caps, and multi-piece covers of interconnected panels.

The single panel or single piece cover has become one of the more popular designs for the tonneau cover. The single piece cover can be color coordinated with the pick-up truck and it can be sculptured to provide an aesthetically pleasing appearance when combined with the pick-up truck. The single piece panel is typically hinged at a position near the cab of the pick-up and it is provided with a latching and locking system near the back of the pick-up box for securing the cover in a closed position.

Two of the design considerations for a tonneau cover are the hinging of the cover and the overall stability of the cover. Typically, a single piece cover is designed using a pair of rails positioned on opposite sides of the pick-up box with the cover being pivotally connected to the two rails. The purpose for this type of construction is to simplify the installation and removal of the cover by removing the need to attach a pivot or a hinge directly to the vehicle. When pivoting the cover on the two side rails, care must be taken to avoid interference between the cover and the pick-up cab when the cover moves between its closed and its open position. This issue is typically resolved by providing a clearance between the cover and the pick-up cab. While this clearance may solve the problem of interference, the gap or clearance which is required may be excessive to the point of detracting from the overall appearance of the closed cover and the pick-up truck.

The overall stability of the cover is affected by the design of the hinges as well as the design of the cover itself. When the cover is in its closed position, it is supported on one end by the pair of hinges and at its opposite end by a pair of latches. This four point connection provides support for the cover with any flexing of the cover being absorbed by the cover itself. In the open position, the cover is supported at one end by the pair of hinges while being left unsupported at its opposite end although a pair of air struts typically keep the cover in its opened position. Thus, in the open position, the stability of the assembly is highly dependent upon the rigidity of the cover itself. Typical covers rely on stiffening ribs and/or metal beams which provide stiffness to the overall cover.

As the demand for single piece covers grows, so does the demand for covers which are both aesthetically pleasing as well as structurally sound.

SUMMARY OF THE INVENTION

The present invention provides the art with a mounting system for a single-piece tonneau cover which includes a square metal frame sandwiched between a plastic outer and a plastic inner panel. The square metal frame provides stability to the cover in both the open and the closed positions as well as providing for the matching of the thermal expansion characteristics between the pick-up truck and the cover assembly. Attached to the steel frame at the pick-up cab end of the cover is a four-bar linkage hinge which simultaneously moves the cover up and towards the rear of the vehicle (away from the cab) when the cover is opened. Because of this up and away movement, the clearance between the cover and the pick-up cab when the cover is closed can be minimized to create a better looking finished product. At the end of the cover opposite to the pick-up cab, a pair of latches are connected to the frame. The latches engage a pair of pins to secure the cover in its closed position. Both the four-bar linkage hinges and the latch pins are attached to a steel rail which is assembled to the pick-up box using a plurality of clamps.

The single piece tonneau cover of the present invention thus provides an aesthetically pleasing cover which is stable in both its closed and open positions. The assembly is easily mounted to the pick-up box requiring little if any modification of the pick-up box itself.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
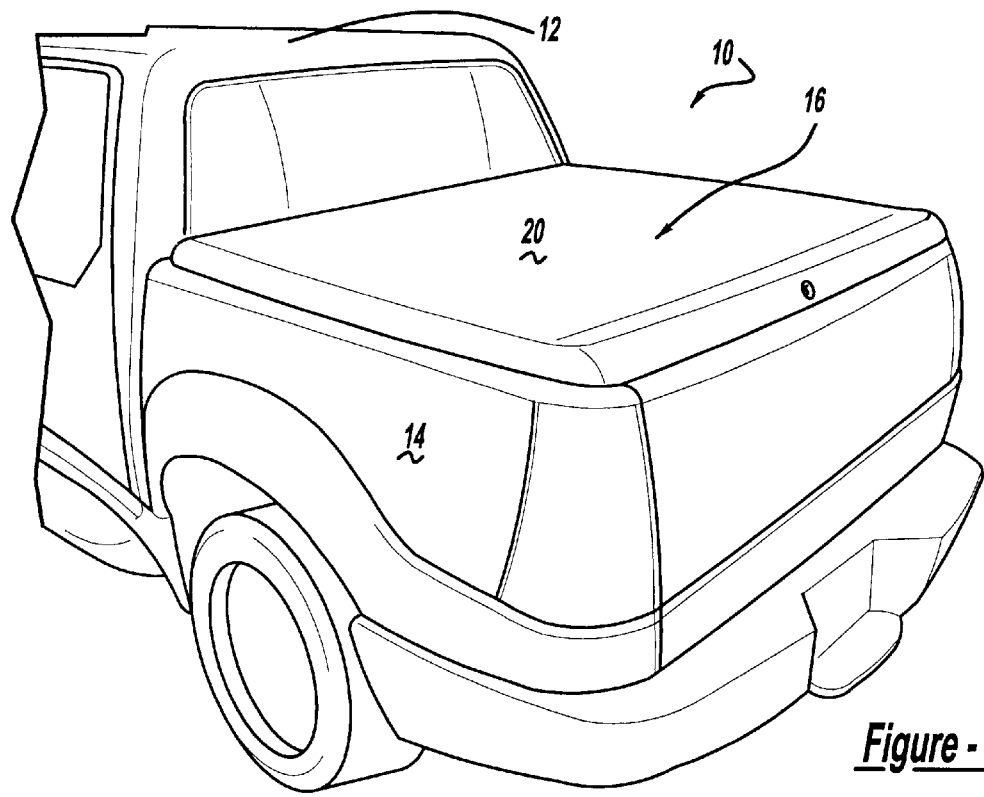
FIG. 1 is a perspective view of a pick-up truck incorporating a tonneau cover utilizing the unique mounting system in accordance with the present invention with the cover in its closed position.

Referring now to the drawings in which like reference numerals designate like or corresponding parts throughout the several views, there is shown in FIG. 1 a pick-up truck incorporating the unique tonneau cover assembly in accordance with the present invention and which is designed generally by the reference numeral 10. Pick-up truck 10 comprises a cab 12, a pick-up box 14 and a tonneau cover assembly 16. Cab 12 is for driving pick-up truck 10 and box 14 is for storing and/or transporting cargo. Box 14 is typically open to the environment surrounding pick-up truck 10 and tonneau cover assembly 16 is typically an original equipment manufactured or an after-market cover assembly which is utilized to protect and/or hide various cargo located within box 14.

Tonneau cover assembly 16 comprises a cover assembly 20, a rail assembly 22, a pair of four-bar linkage hinges 24, a pair of latch assemblies 26 and a pair of struts 28.

Figure 3:
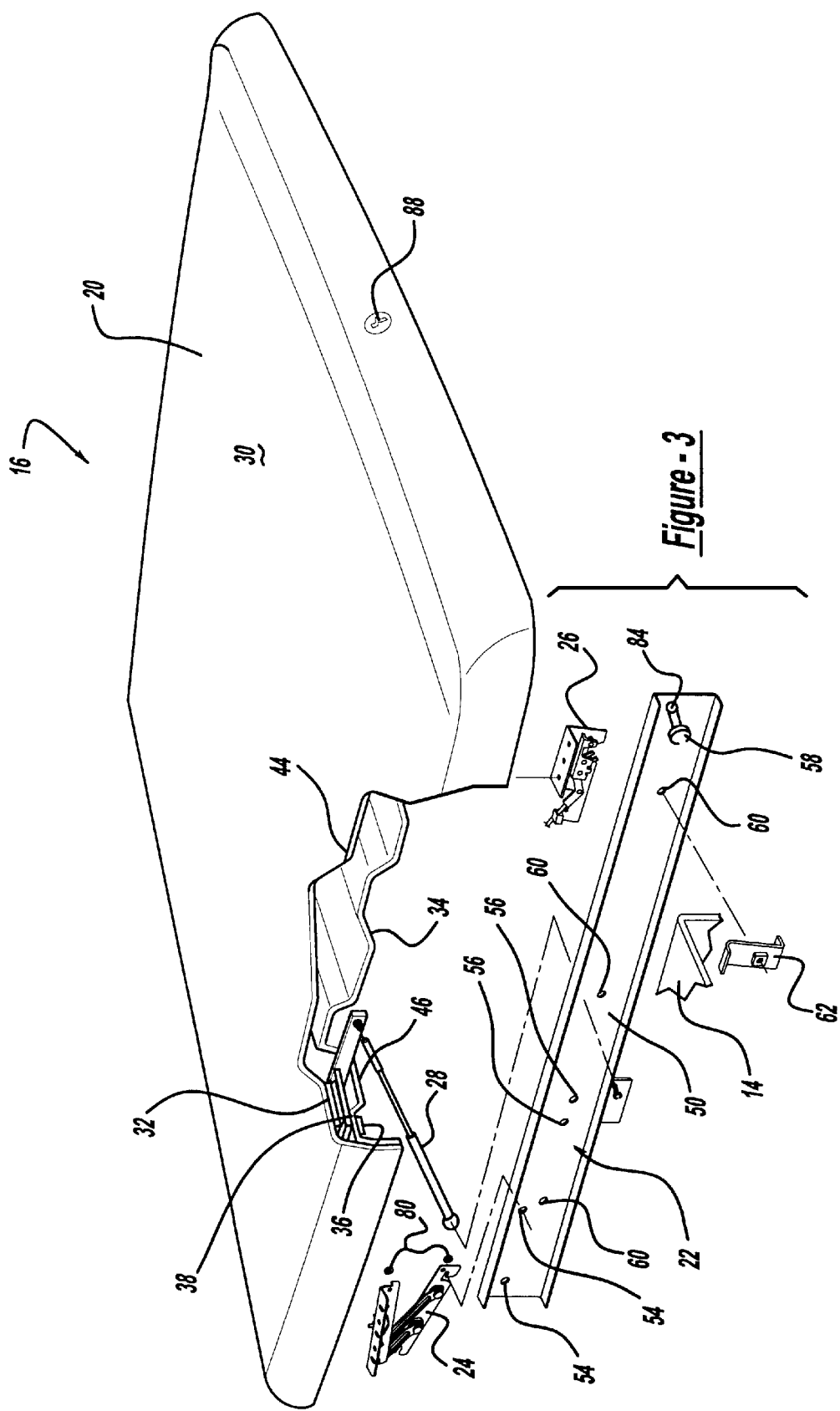
FIG. 3 is an exploded perspective view of the tonneau cover and the mounting system shown in FIGS. 1 and 2.
Figure 4:
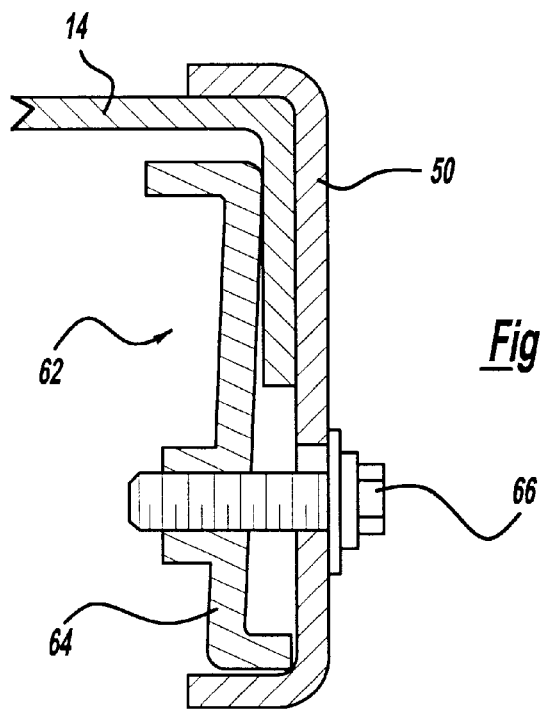
FIG. 4 is an enlarged cross-sectional view of the mounting clamps for the tonneau cover assembly shown in FIGS. 1–3.
Figure 8:
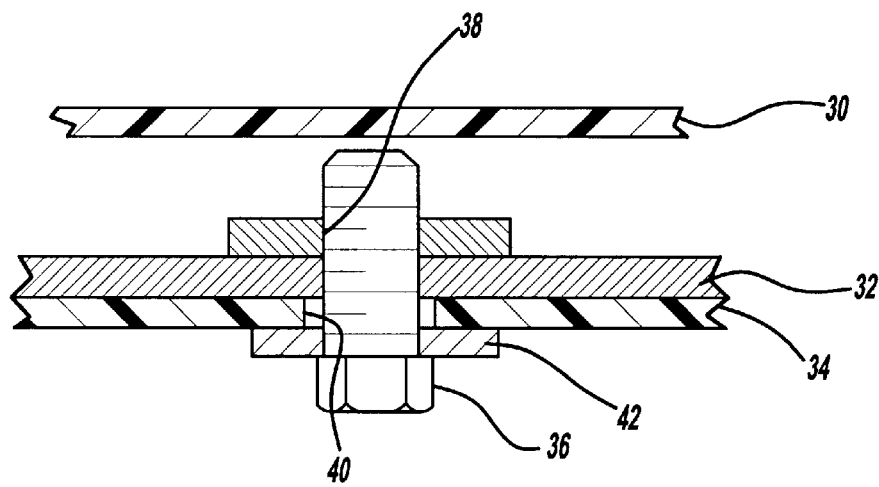
FIG. 8 is an enclosed cross section of the three piece sandwich construction for the tonneau cover.
Figure 9:
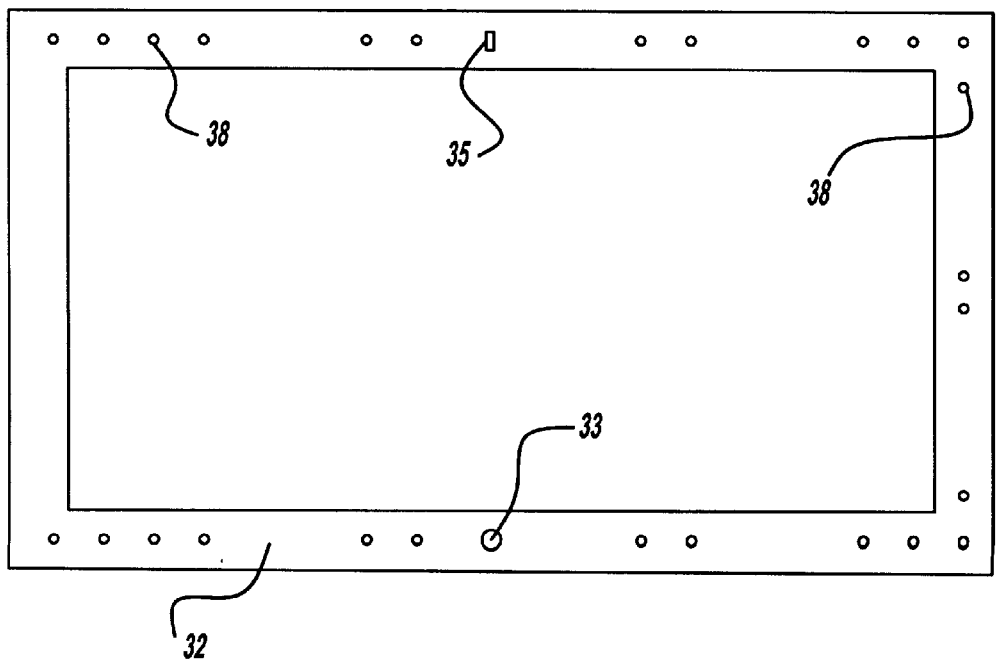
FIG. 9 is a plan view of the reinforcing member in accordance with the present invention.

Cover assembly 20 comprises an outer layer or panel 30, a reinforcement frame 32 and an inner layer or panel 34. Outer panel 30 provides the external appearance for tonneau cover assembly 16. Outer panel 30 is color-keyed to the color of pick-up truck 10 and it is sculptured to provide an aesthetically pleasing appearance while providing protection for the interior of pick-up box 14 of pick-up truck 10. Outer panel 30 can be the same color as pick-up truck 10, it can be accent colored to the color of pick-up truck 10 and/or it can have a textured appearance. Outer panel 30 is bonded to inner panel 34 after the assembly of reinforcement frame 32 to inner panel 34 as described below. As shown in FIGS. 3 and 9, reinforcement frame 32 is a generally rectangular shaped frame which is sized to mate with inner panel 34 near the outer edge of the panel. Reinforcement frame 32 provides stability to cover assembly 20 as well as providing for the attachment of the other components of cover assembly 20. The side bars for reinforcement frame 32 include a weak point in the approximate center of the frame. This weak point is formed by a hole 33 or a slot 35 and it acts as a crash initiator which causes cover assembly 20 to buckle during a crash rather than being pushed into cab 12. Reinforcement frame 32 is bolted to inner panel 34 using a plurality of bolts 36. Reinforcement frame 32 includes a plurality of threaded mounting holes 38 which are used for bolting frame 32 to inner panel 34, for mounting hinges 24, for mounting latches 26, for mounting struts 28 as well as for mounting other components of tonneau cover assembly 16. As shown in FIG. 8, inner panel 34 defines a plurality of holes 40 which are larger in diameter than bolt 36. The head of bolt 36 or a washer 42 secures inner panel 34 to reinforcement frame 32. The space between bolt 36 and hole 40 compensates for the difference in thermal expansion between the steel used for pick-up box 14 and the plastic used for cover assembly 20. Thus, by using rails 50 and 52 which are made from steel, and connecting these rails to reinforcement frame 32 which is also made of steel, the thermal expansion of cover assembly 20 is matched to the thermal expansion of pick-up box 14. As detailed above, the space between bolt 36 and hole 40 compensate for the difference in thermal expansion between the steel and the plastic. Inner panel 34 defines a plurality of corrugations 44 which provide for stiffening of cover assembly 20. Inner panel 34 defines a plurality of apertures 46 which provide access to frame 32 for the various components which need to be attached to reinforcement frame 32.

Referring now to FIGS. 1–4, tonneau cover assembly 16 is secured to pick-up truck 10 using rail assembly 22. Rail assembly 22 comprises a left rail 50 and a right rail 52. Rails 50 and 52 are similar in design with one being the mirror image of the other and thus only rail 50 will be detailed. It is to be understood that rail 52 includes the features described below for rail 50. Rail 50 is a generally U-shaped rail with the top end of the U-shaped structure being longer than the bottom in order for rail 50 to lie on the top surface of pick-up box 14. Rail 50 includes a pair of threaded studs 54 for mounting a respective hinge 24, a pair of threaded holes 56 for mounting a respective strut 28, a threaded hole 58 for mounting latch assembly 26 and a plurality of apertures 60 for mounting rail 50 onto pick-up box 14. Rail 50 is mounted to pick-up box 14 using a plurality of clamps 62. Each clamp 62 includes a bracket 64 and a threaded bolt 66. The mounting of rail 50 is accomplished by assembling a respective bolt 66 through each of apertures 60 and then threadingly engaging bracket 64. Rail 50 is then positioned on the side wall of pick-up box 14 with each bracket 64 being positioned within an opening and behind a flanged portion of the side wall of pick-up box 14. Bolts 66 are then tightened to clamp rail 50 to the sidewall of pick-up box 14. As mentioned above, rail 52 is of a similar design and is mounted on the opposite side rail of pick-up box 14 in the same manner.

Figure 5:
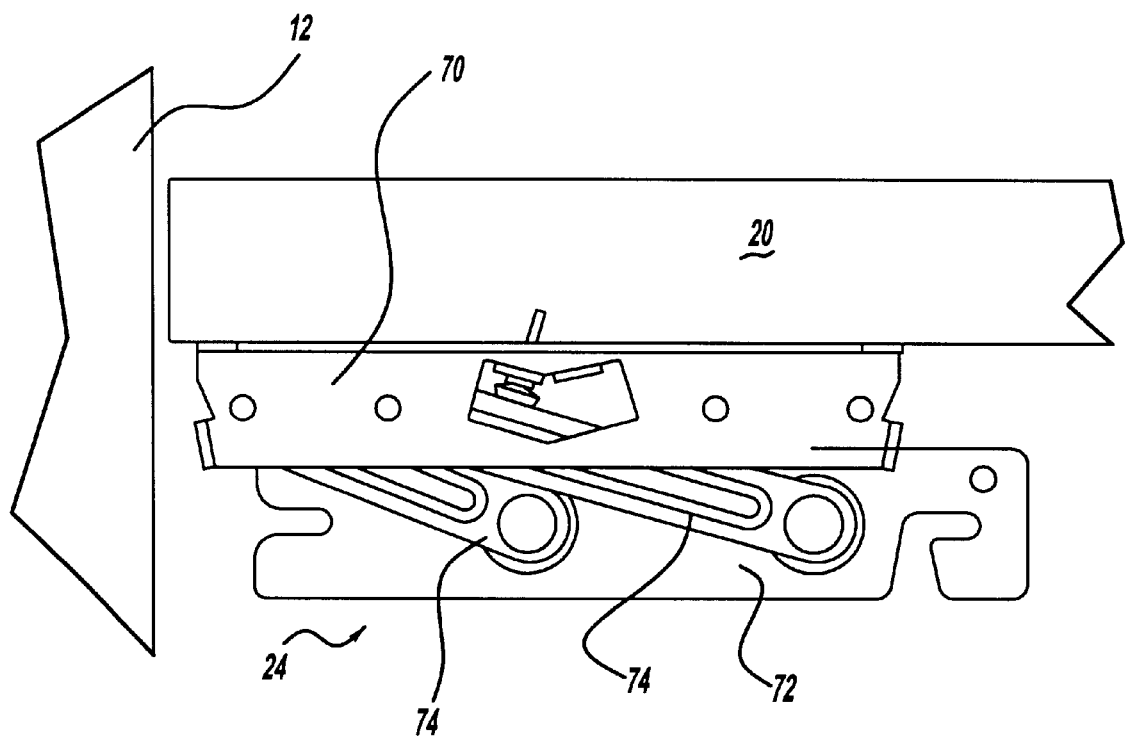
FIG. 5 is a side view illustrating the four-bar linkage hinge in accordance with the present invention with the cover in its closed position.
Figure 6:
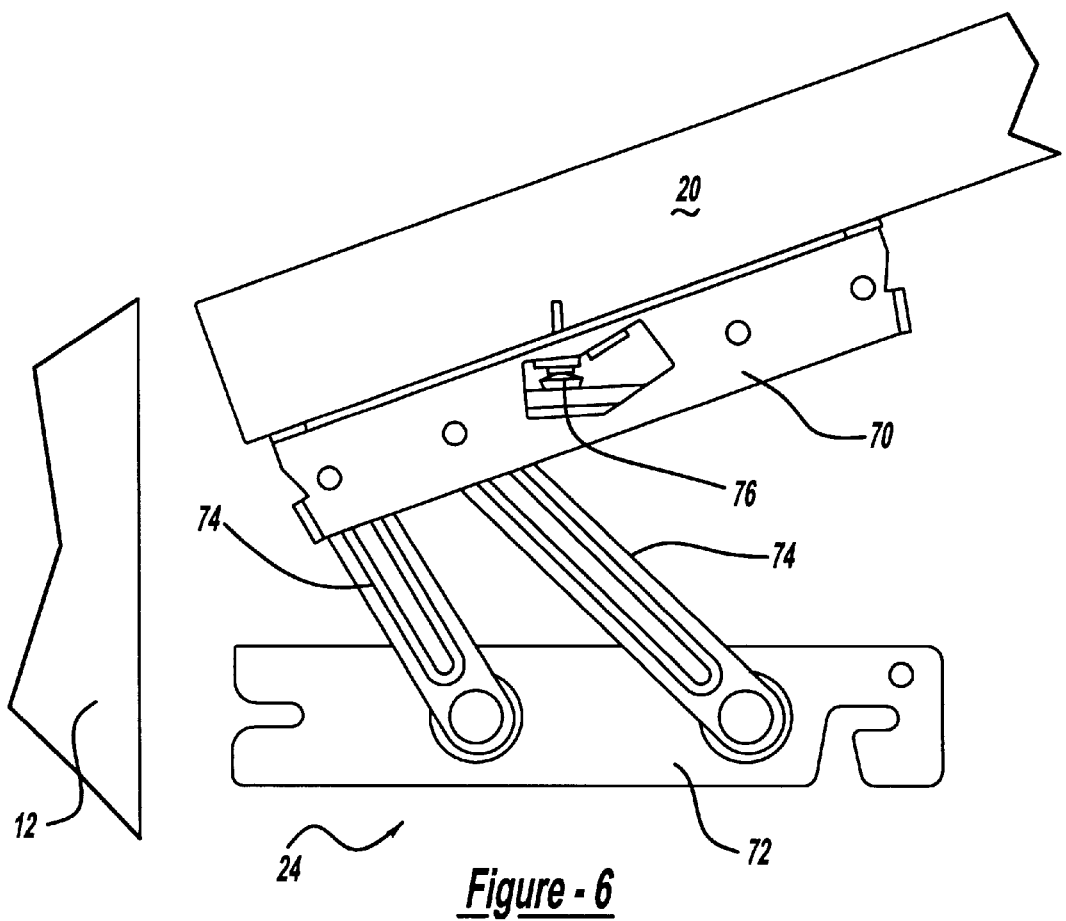
FIG. 6 is a side view similar to that shown in FIG. 5 with the cover in its open position.
Figure 7:
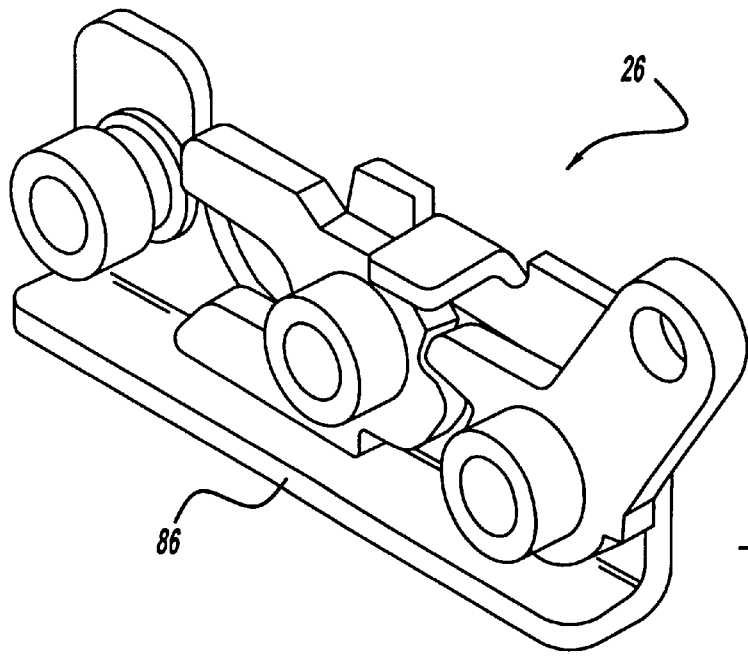
FIG. 7 is an enlarged prespective view of the latch shown in FIGS. 2 and 3.

Referring now to FIGS. 1–3, 5 and 6, cover assembly 20 is pivotally secured to each rail 50 or 52 using a respective four-bar linkage hinge 24. Hinge 24 comprises a cover bracket 70, a siderail bracket 72 and a pair of links 74. Cover bracket 70 is an L-shaped bracket which utilizes one leg of the L for mounting bracket 70 to reinforcement frame 32 of cover assembly 20 and which utilizes the other leg of the L to pivotally mount links 74 as well as a pair of elastomeric bushings 76. Bracket 70 is mounted to frame 32 of cover assembly 20 using a plurality of bolts. One of these bolts is also utilized to mount one end of a safety cable 80. The opposite end of safety cable 80 is connected to rail 50 or 52 using one of threaded studs 54. Side rail bracket 72 is a generally planar bracket which is utilized for mounting to either side rail 50 or side rail 52 using the pair of threaded studs 54. Links 74 are each pivotally attached to bracket 70 at one end and to bracket 72 at their opposite end to create a four-bar linkage. As shown in FIGS. 5 and 6, the advantage in using four-bar linkage hinges 24 is that when cover assembly 20 is moved from its closed position shown in FIG. 5 to its open position shown in FIG. 6, cover assembly 20 moves both up from pick-up box 14 and away from cab 12. Because of this up and away movement, it is possible to position cover assembly 20 closer to cab 12 when cover assembly 20 is located in its closed position as shown in FIG. 5. The issue of interference between cover assembly 20 and cab 12 is resolved because of the up and away movement provided by hinges 24.

Referring now to FIGS. 1–3 and 7, latch assemblies 26 secure cover assembly 20 in its closed position. Each latch assembly 26 includes a locking stud 84 secured to threaded hole 58 of rail 50 or 52 and a latch mechanism 86 secured to reinforcement frame 32. Latch mechanism 86 and locking stud 84 are similar to typical latching systems which are known well in the art and thus will not be described in further detail. The unique feature for latch mechanism 86 is that it includes an elongated slot 88 which engages stud 84. Elongated slot 88 allows for front to rear movement of cover assembly 20 in addition to the side movement provided between latch mechanism 86 and locking stud 84. Latch assembly 26 is locked by the action of closing cover assembly 20 which engages latch mechanism 86 with locking stud 84 to keep cover assembly 20 in its closed position. To release latch mechanism 86 for opening cover assembly 20, a locking mechanism 88 is utilized. Locking mechanism 88 is activated by the user with a key which when activated releases latch mechanisms 86 using a cable system as is well known in the art. A manual release 90 is provided should a problem with mechanism 88 occur. Also a strap 92 is provided, attached to reinforcement frame 32, to assist the user in closing cover assembly 20.

Figure 2:
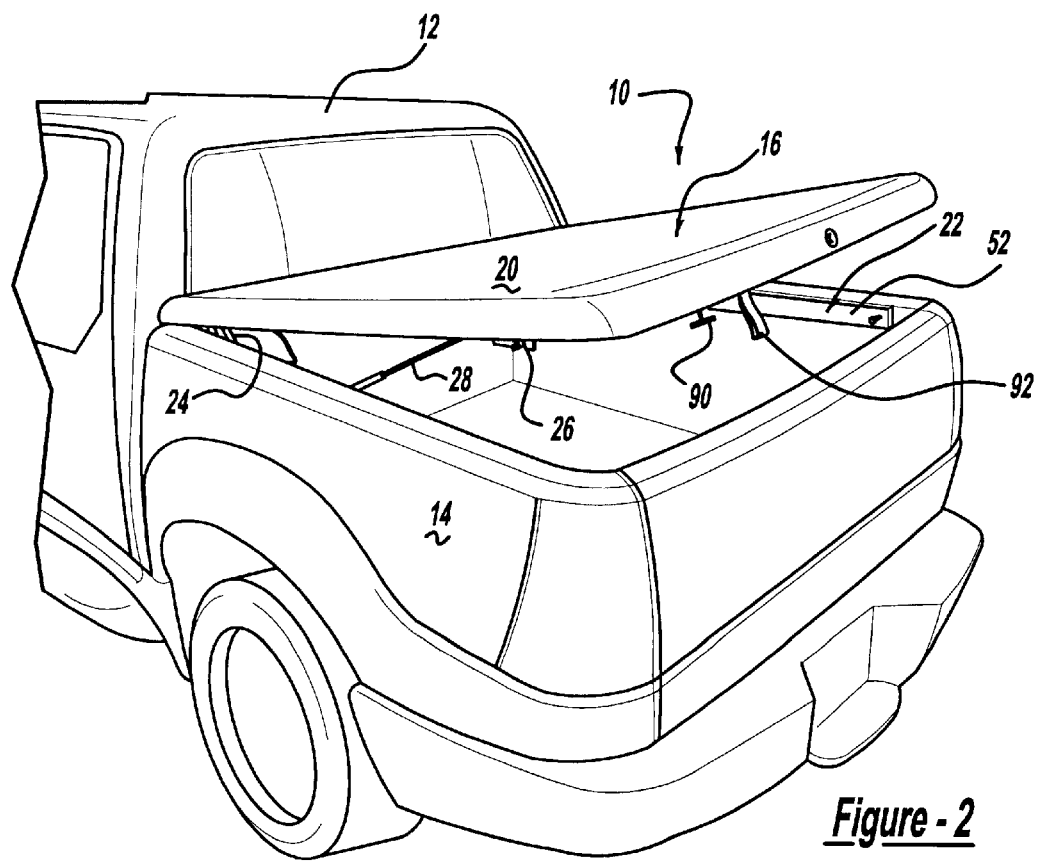
FIG. 2 is a perspective view of the pick-up truck shown in FIG. 1 with the cover in its open position.

Referring now to FIGS. 1–3, struts 28 are utilized to keep cover assembly 20 in its open position. Struts 28 utilize pressurized air cylinders which support cover assembly 20 as is known in the art. One end of each strut 28 is pivotally secured to side rail 50 or 52 and the opposite end is pivotally secured to reinforcement frame 32. When cover assembly 20 is in its open position, each strut 28 extends angularly between rail 50 or 52 and cover assembly 20 to support the weight of cover assembly 20. When cover assembly 20 is in its closed position, each strut 28 pivots to a position generally parallel to side rail 50 or 52 as is well known in the art.

While the above detailed description describes the preferred embodiment of the present invention, it should be understood that the present invention is susceptible to modification, variation and alteration without deviating from the scope and fair meaning of the subjoined claims.

What is claimed is:

1. A tonneau cover assembly comprising:
   a pair of mounting rails;
   a cover pivotally attached to said pair of mounting rails;
   a first hinge disposed between said pair of mounting rails and said cover;
   a second hinge disposed between said pair of mounting rails and said cover; wherein
   said cover comprises:
      a generally rectangular single piece plastic outer panel defining four outside edges;
      a single piece plastic inner panel; and
      a generally rectangular reinforcement member sandwiched between said outer panel and said inner panel adjacent said four outside edges of said outer panel for providing stability for said cover, said reinforcement member defining a plurality of mounting holes; and
   said first and second hinges each comprise:
      a first bracket attached to said pair of mounting rails;
      a second bracket attached to said reinforcement member through at least one of said mounting holes;
      a first link pivotally secured to said first and second brackets; and
      a second link pivotally secured to said first and second brackets.

2. The tonneau cover assembly according to claim 1 further comprising a pair of struts disposed between said reinforcement member and said said pair of mounting rails.

3. The tonneau cover assembly according to claim 1 further comprising a latch assembly secured to said reinforcement member and said pair of mounting rails.

4. The tonneau cover assembly according to claim 1 further comprising a pair of struts disposed between said cover and said pair of mounting rails.

5. The tonneau cover assembly according to claim 1 further comprising a latch assembly disposed between said cover and said pair of mounting rails.

6. The tonneau cover assembly according to claim 1 wherein side bars of said generally rectangular reinforcement member include a weak point for acting as a crash initiator.

7. The tonneau cover assembly according to claim 6 wherein said weak point is an aperture.

8. A tonneau cover assembly for a pick-up truck, said tonneau cover assembly comprising:
   a first mounting rail adapted to be secured to said pick-up truck;
   a second mounting rail adapted to be secured to said pick-up truck;
   a cover pivotally attached to said first and second mounting rails, said cover comprising:
      a generally rectangular single piece plastic outer panel defining four outside edges;
      a single piece plastic inner panel; and
      a generally rectangular reinforcement member sandwiched between said outer panel and said inner panel adjacent said four outside edges of said outer panel for providing stability for said cover, said reinforcement member defining a plurality of mounting holes;
   a first hinge disposed between said first mounting rail and said cover, said first hinge comprising:
      a first rail bracket attached to said first mounting rail;
      a first cover bracket attached to said reinforcement member through at least one of said plurality of mounting holes;
      a first link pivotally secured to said first rail bracket and said first cover bracket;
      a second link pivotally secured to said first rail bracket and said first cover bracket.

9. The tonneau cover assembly according to claim 8 further comprising a second hinge disposed between said second mounting rail and said cover, said second hinge comprising:
   a second rail bracket attached to said second mounting rail;
   a second cover bracket attached to said reinforcement member;
   a third link pivotally secured to said second rail bracket and said second cover bracket; and
   a fourth link pivotally secured to said second rail bracket and said second cover bracket.

10. The tonneau cover assembly according to claim 8 wherein side bars of said generally rectangular reinforcement member include a weak point for acting as a crash initiator.

11. The tonneau cover assembly according to claim 10 wherein said weak point is an aperture.

12. A tonneau cover assembly for a pick-up truck, said tonneau cover assembly comprising:
   a first mounting rail adapted to be secured to said pick-up truck;
   a second mounting rail adapted to be secured to said pick-up truck;
   a cover pivotally attached to said first and second mounting rails, said cover comprising:
      a generally rectangular single piece plastic outer panel defining four outside edges;
      a single piece plastic inner panel;
      a generally rectangular reinforcement member disposed between said outer panel and said inner panel adjacent said four outside edges of said outer panel for providing stability for said cover, said reinforcement member defining a plurality of mounting holes; and
      a first hinge attached to one of said mounting rails and attached to said reinforcement member through at least one of said plurality of mounting holes for pivotally mounting said cover.

13. The tonneau cover assembly according to claim 12 wherein said reinforcement frame includes a rectangular metal frame.

14. The tonneau cover assembly according to claim 12 further comprising a second hinge attached to the other of said mounting rails and attached to said reinforcement member through at least one of said plurality of mounting holes for pivotally mounting said cover.

15. The tonneau cover assembly according to claim 12 wherein side bars of said generally rectangular reinforcement member include a weak point for acting as a crash initiator.

16. The tonneau cover assembly according to claim 15 wherein said weak point is an aperture.

* * * * *

UNITED STATES PATENT AND TRADEMARK OFFICE
CERTIFICATE OF CORRECTION

PATENT NO.     : 6,447,045 B1
DATED          : September 10, 2002
INVENTOR(S)    : Floyd R. Dickson et al.

It is certified that error appears in the above-identified patent and that said Letters Patent is hereby corrected as shown below:

<u>Title page,</u>
Item [73], Assignee,
"Algonquin International Industries, Inc." should be -- Algonquin Industries International, Inc. --

<u>Column 6,</u>
Line 24, after "bracket;" insert -- and --

Signed and Sealed this

Twenty-ninth Day of April, 2003

JAMES E. ROGAN
*Director of the United States Patent and Trademark Office*